March 25, 1952
W. FEW ET AL
2,590,393
FREQUENCY RELAY
Filed Sept. 22, 1948
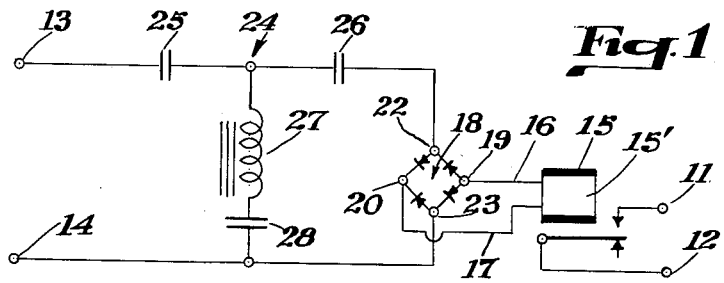
Fig.1
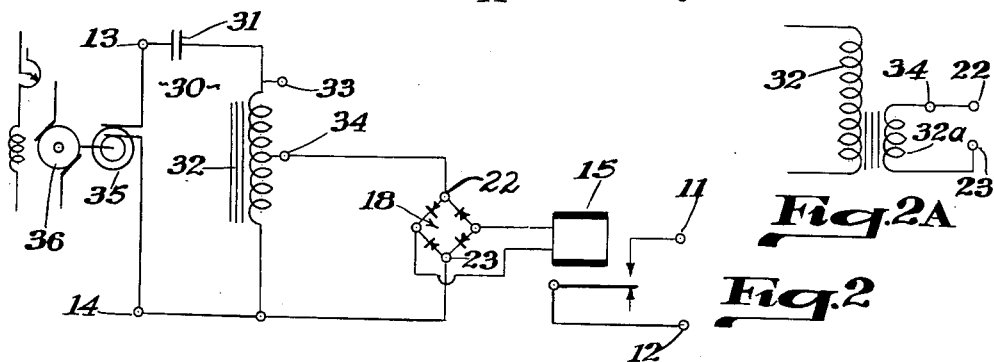
Fig.2
Fig.2A
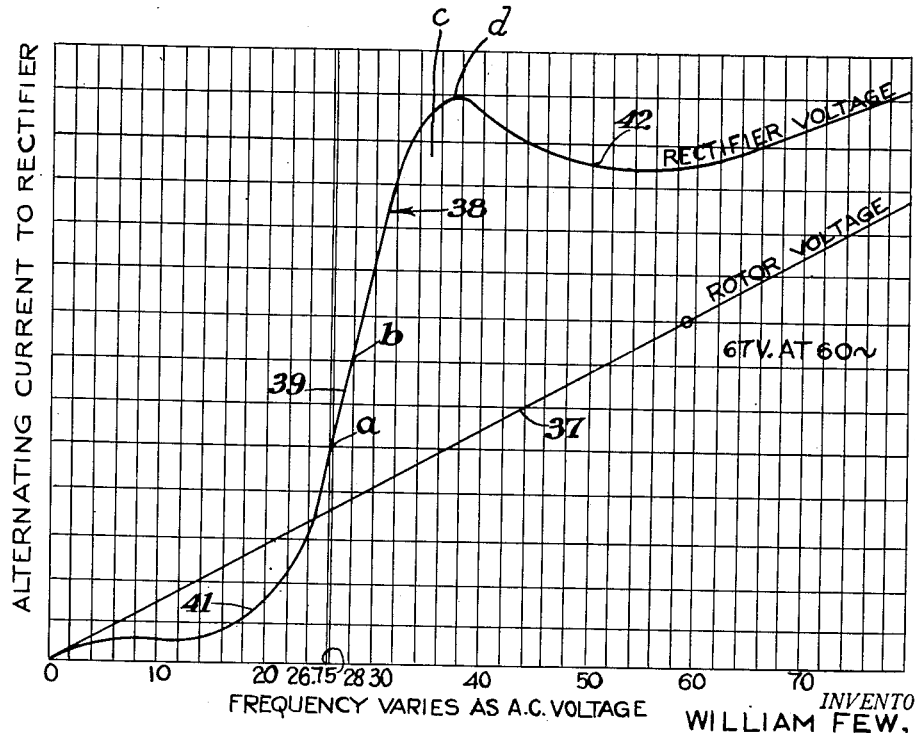
Fig.3
INVENTORS.
WILLIAM FEW,
JOHN D. SAUTER &
BY WILLIAM F. SZABO.
*Frederic B. Schramm*
ATTORNEY.

Patented Mar. 25, 1952

2,590,393

UNITED STATES PATENT OFFICE 2,590,393

FREQUENCY RELAY

William Few and John D. Sauter, Cleveland Heights, and William F. Szabo, Cleveland, Ohio, assignors to The Clark Controller Company, Cleveland, Ohio, a corporation of Ohio Application September 22, 1948, Serial No. 50,636

1 Claim. (Cl. 175—320)

Our invention relates to electrical control circuits and methods of operating alternating-current systems.

An object of our invention is to provide improved arrangements for controlling or observing the condition of alternating-current circuits of varying voltage and frequency.

Another object of our invention is to provide relays for alternating-current circuits which are responsive to slight deviations from a predetermined frequency or to slight deviations of alternating-current machines from a predetermined speed.

Another object of our invention is to render relays and other current-responsive devices precisely, accurately and reliably responsive, with a high degree of sensitivity, to the electrical condition in a circuit in which frequency and voltage are varying concurrently in the same direction.

Still another object of the invention is to enable a slight change in frequency to produce the requisite difference in current of a relay, or the like, between the pick-up and drop-out values.

Still another object of the invention is to assure that the current flowing in the relay will exceed the drop-out value for all frequencies above that at which the relay is intended to be responsive.

Other and further objects, features and advantages of the invention will become apparent as the description proceeds.

Alternating-current relays, recorders, indicating instruments, integrating meters and the like, all contain a substantial amount of inductance so that the current flow therein depends not only on the applied voltage, but also upon the frequency which determines the reactance for given value of inductance. Since varying frequencies in alternating-current systems ordinarily result from variations in speed of a device in which alternating current is induced, such as the stator of a synchronous machine or the wound rotor or the stator of an induction machine, as the case may be, voltage and frequency in such systems ordinarily vary in proportion. An alternating-current responsive device in such systems lacks sensitivity to variations in voltage because these are accompanied by proportionate changes in frequency resulting in proportionate changes in reactance of the device. Consequently such current-responsive devices are ineffective and unreliable to indicate or control variations in frequency.

We are aware that proposals have been made to utilize the phenomenon of resonance in order to accentuate the response of a relay or the like at a certain frequency; however, we desire to provide methods and apparatus providing a higher degree of reliability, sensitivity, accuracy and precision than heretofore obtained in endeavoring to employ the phenomenon of resonance. For example, we desire to obtain a far greater margin of safety between the current flow at high frequencies above the value for which the relay or the like is set and the drop-out current value at the minimum frequency for which the relay or the like is to remain energized.

In carrying out our invention in accordance with a preferred form thereof, we utilize a direct-current type of relay, recorder or other current-responsive device, according to the type of response desired. In order to obtain a high degree of sensitivity and to assure response to slight variations in the condition to be measured or responded to, we use a device with a direct-current winding and interpose a high-pass filter and a rectifier, preferably a full-wave rectifier, between the direct-current winding of the responsive device, such as the relay, and the two terminals or points of an electrical system, the voltage between which is employed for actuating the actual relay or the like. Moreover, we interpose the filter between the rectifier and such input or pick-up terminals, and we select a high-pass filter having electrical constants so chosen as to have a pass frequency above the maximum frequency at which it is intended the relay or the like shall respond. We may employ pie or T filters having one or more sections, such as filters of the M derived type. We have, however, found satisfactory results to be obtainable in ordinary systems by the use of a single-section constant K type of filter.

A better understanding of the invention will be afforded by the following detailed description considered in conjunction with the accompanying drawing, in which Fig. 1 is a circuit diagram of a preferred arrangement for obtaining sensitive response to variations in frequency;

Fig. 2 is a circuit diagram of a modification of the arrangement of Fig. 1 illustrating a variable frequency alternating-current system in which response to variations in frequency is obtained;

Fig. 2a is a fragmentary diagram of a modification of the arrangement of Fig. 2; and Fig. 3 is a graph illustrating the principle of operation of the arrangement of Fig. 2.

Like reference characters are utilized throughout the drawings to designate like parts.

Referring to Fig. 1 of the drawing, for the sake of illustration it is assumed that it is desired to control an electrical circuit between a pair of terminals, such as terminals 11 and 12, in response to increase above a predetermined value of the frequency of an alternating-current voltage appearing at terminals 13 and 14 of an alternating-current system. A current-responsive device 15, such as a relay, is utilized having a suitable winding and magnetic circuit for response to direct-current. Since such direct-current relays and other direct-current devices are well known to those skilled in the art, the relay 15 is merely represented conventionally in the drawing. For energizing the winding 15' of the relay 15 through input conductors 16 and 17, a rectifier, preferably a full-wave rectifier 18, is provided having output terminals 19 and 20 connected to the conductors 16 and 17 and having input terminals 22 and 23. Between the input terminals 13 and 14 of the frequency-responsive apparatus and the input terminals 22 and 23 of the rectifier 18, a high-pass filter 24 is interposed. This may take the form, as illustrated in Fig. 1, of a pair of condensers 25 and 26 connected in series between the terminals 13 and 22 and a series pair of elements, consisting of an inductance 27 and a condenser 28 connected across the lines having the terminals 13 and 14, and 22 and 23. As shown, the elements 27 and 28 are connected in series between the line 14—23 and a common point or junction terminal 29 of the condensers 25 and 26.

If desired, a simplified form of high-pass filter may be employed, such as the constant K type of filter 30 illustrated in Fig. 2, consisting of a condenser 31 and an inductance 32 connected in series to the pair of input terminals 13 and 14 of the frequency-responsive apparatus. Constant-K type filters are electric networks of the type well known in the communications and electrical arts in which there are series and shunt impedance legs or elements, and the series and shunt impedances are inverse reactances such that the product of the two impedances is the constant referred to as $K^2$; and in case of a high pass filter $K^2$ is the ratio of inductance to capacity in each element of the network. Constant-K filters and M-derived filters such as shown in Fig. 1 of the drawings are described, for example, in the Third Edition of the Electrical Engineer's Handbook by Pender and McIlwain, published in 1936 (Electrical Communications and Electronics) pages 7–35 and illustrated on pages 7–47. Such filters are described also in a volume entitled "Wave Filters" by L. C. Jackson, published by Methuen and Company, London, 1944, and by A. T. Starr at page 214 in his volume entitled "Electric Circuits and Wave Filters" published in 1934. The input terminals 22 and 23 of the rectifier 18 are connected to the output of the filter 30. The input terminal 22 of the rectifier 18 may, if desired, be connected to a terminal 33 constituting a junction terminal of the condenser 31 and the inductance 32, and the rectifier terminal 23 may be connected to the terminal 14. Thus, the condenser 31 is made a series element and the inductance 32 a shunt element, that is to say, the condenser 31 is in series with the line and the inductance 32 is across the line. Where, however, it is desired to employ a device 15 wound for a lower voltage than would be obtained as a result of the voltage existing between the input terminals 13 and 14 of the frequency-responsive apparatus, the equivalent arrangement may be employed where the inductance 32 is provided with an intermediate tap 34 connected to the rectifier terminal 22. The element 32 serves as a step-down voltage transformer or instrument transformer, as well as serving as the inductance element of the filter 30. Equivalent results may be obtained by the use of a separate winding 32a for the low voltage source and thereby obtain separation of circuits and in some instances greater convenience in coil construction. In this event, the primary coil 32 is unchanged, with additional needed turns 32a added for the secondary coil as illustrated in Fig. 2A.

Frequency-responsive relays and the like are used frequently for controlling electrical circuits in which voltage and frequency vary together, or for effecting other control operations in response to variations in frequency, or to variations of speed in an alternating machine. For example, in the control of wound rotor induction motors having starter resistances in the rotor circuit, it may be desired to render a relay responsive to drop in slip fequency to a sufficiently low value for cutting out one or more steps of starting resistance, as the motor comes up to speed. In another illustration in connection, for example, with variable speed woodworking machinery, it may be desirable to effect speed control of synchronous motors by variation in the frequency of a supply current. Thus, for example, if a multi-pole high-frequency generator 35 is driven by a variable speed motor 36, desired changes in frequency for driving two-pole high-speed woodworking tools may be obtained, but variations in frequency are accompanied by proportionate variations in voltage. This makes ordinary alternating-current control or safety devices unsuitable.

Fig. 3 is a graph in which values of frequency are plotted along the horizontal scale and values of voltage are along the vertical scale. As indicated by a straight line 37, voltage and frequency of a rotary alternating-current machine vary in proportion to each other. This line 37 may represent the voltage of the generator 35 in Fig. 2 plotted against frequency or speed of the machine 35, or a similar straight line would represent the variation in voltage appearing at the rotor of an induction machine plotted against the slip in cycles, where the slip represents the algebraic difference between the actual and the synchronous speed of the machine. Thus the standstill rotor frequency or slip is the same as the frequency of the input to the stator. The rotor frequency falls toward zero as the rotor approaches synchronous speed, and rises above line frequency if the rotor should be driven in the reverse direction with reference to the rotation of the magnetic field.

Although the actual voltage along the line 37 rises linearly with an increase in frequency, the effect in the alternating-current relay or other alternating-current device is substantially the same at one frequency as at another, owing to the fact that reactance opposing the flow of current rises as rapidly as the voltage. By employing the high-pass filter and rectifier arrangement illustrated in Fig. 2, the curve 38 illustrated in Fig. 3 is obtained. The curve 38 represents the measured voltage at the input terminals 22 and 23 of the rectifier 18, and, as will be understood by those skilled in the art, the direct-current applied to the relay 15 would vary proportionally thereto or would for practical purposes be proportional thereto in the working range.

Our invention is not limited to the use of electrical elements with specific value of electrical constants. Nevertheless, for the sake of illustration, specific values will be given for an illustrative installation in which satisfactory operation was obtained. Satisfactory results have been obtained, for instance, in the case of a 60-cycle induction machine 35 adapted to be run or be driven between synchronous speeds in opposite directions, that is, from 0 to 200° slip, giving from 0 to 120 cycles, slip-ring output with a slip-ring voltage increasing linearly to about 67 volts at 60-cycle slip-ring frequency, and double the voltage at 120-cycle slip-ring frequency, with an 1800-ohm coil for the relay 15, with the rectifier terminal 22 connected to the inductance terminal 33 instead of the terminal 34, illustrated in Fig. 2, with the element 32 having an inductance of 2.4 henries with inherent resistance of 13 ohms, and the condenser 31 having a capacity of 9.4 microfarads. The peak value of applied rectifier voltage (point $d$ of curve 38) was then found to be about 105 volts. The other values of voltage were as indicated relatively in Fig. 3.

Satisfactory results were obtained in the arrangement of Fig. 1 designed for pick-up and drop-out frequency of 21 and 20.4, respectively, with circuit constants approximately as follows, for example:

Condenser 25, 24 mf.
Condenser 26, 24 mf.
Inductance 27, 2.85 henries
Condenser 28, 18 mf.
Resistance of relay winding 15', 1226 ohms (1300 ohms including rectifier 18)

It will be understood that in practice there is a difference between the minimum current which is required to assure that a relay will pick up and the value to which the current must fall to make sure that the relay will drop out. It is assumed, for example, that the relay 15 is so designed that it will with perfect reliability pick up as soon as the current rises to the value $b$ and drop out as soon as the current falls to the value $a$. The constants of the high-pass filter 30 are so chosen that the pass frequency exceeds the frequency corresponding to the current value $b$. According to the curve 38, it will be observed that a relatively slight variation in frequency, for example between 26.75 cycles and 28 cycles, is required in order to produce the variation between the current values $a$ and $b$ representing drop-out and pick-up values for the relay. The apparatus is operated on the steep part 39 of the curve, thus greatly increasing the effective sensitivity of even a very sensitive relay. It will be understood that the values $a$ and $b$ have been illustrated considerably further apart vertically than the actual difference in pick-up and drop-out currents obtained in practice in order to bring out more clearly the manner in which the precision is enhanced by the filter. Furthermore, it will be observed that the initial portion 41 of the curve 38 is very low, assuring that there will be no difficulty from false operations below 26.75 cycles, or from tardy drop-out in case the frequency should fall suddenly to some value substantially below 26.75 cycles. Moreover, a very important feature of the characteristic curve of the apparatus is that the portion 42 of the curve to the right of the cut-off or pass frequency $c$ remains relatively high in comparison with the peak value $d$, and the portion 42 of the curve continues to rise indefinitely with increase in frequency. Consequently, all portions of the curve to the right of the peak value $d$ are well above the pick-up value $b$, so that there is no danger of the relay 15 dropping out for any frequency above the frequency for which it is designed, for example 28 cycles, regardless of how high the frequency may rise.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended, therefore, to cover all such modifications and variations as fall within the scope of the invention which is defined in the appended claim.

We claim:

Relay apparatus responsive to alternating-currents above a predetermined band of frequencies comprising in combination a pair of apparatus input terminals, a full-wave rectifier having input and output terminals, a relay having a winding for direct-current connected to the output terminals of said rectifier, and a high-pass filter comprising two serially connected capacitors connected between one of said apparatus input terminals and one of said rectifier input terminals and an inductor and a capacitor in serial connection between the junction of the said two serially connected capacitors and the remaining apparatus input terminal, the constants of said high-pass filter being chosen for passing frequencies exceeding the maximum frequency of said band of frequencies for which the relay apparatus is designed.

WILLIAM FEW.
JOHN D. SAUTER.
WILLIAM F. SZABO.

REFERENCES CITED

The following references are of record in the file of this patent:

UNITED STATES PATENTS

| Number | Name | Date |
| --- | --- | --- |
| 1,758,540 | Shaw | May 13, 1930 |
| Re. 21,659 | Adler | Dec. 17, 1930 |
| 1,959,161 | Grondahl | May 15, 1934 |
| 2,021,753 | Suits | Nov. 19, 1935 |
| 2,231,174 | Trogner | Feb. 11, 1941 |
| 2,341,526 | Breitenstein | Feb. 15, 1944 |
| 2,542,638 | Desch | Feb. 20, 1951 |

FOREIGN PATENTS

| Number | Country | Date |
| --- | --- | --- |
| 662,881 | Germany | July 23, 1938 |
| 566,862 | Great Britain | Jan. 17, 1945 |

OTHER REFERENCES

"Relay Engineering," by C. A. Packard, 1st edit., 1945, published by Struthers-Dunn, Inc., Philadelphia, Pa., pages 227, 228 and 229.

"Transmission Networks and Wave Filters," by T. E. Shea, 1929, pages 221–230, published by D. Van Nostrand Co., 250 Fourth Ave., N. Y.